(No Model.)
L. BELL.
FILTER.
No. 356,819. Patented Feb. 1, 1887.
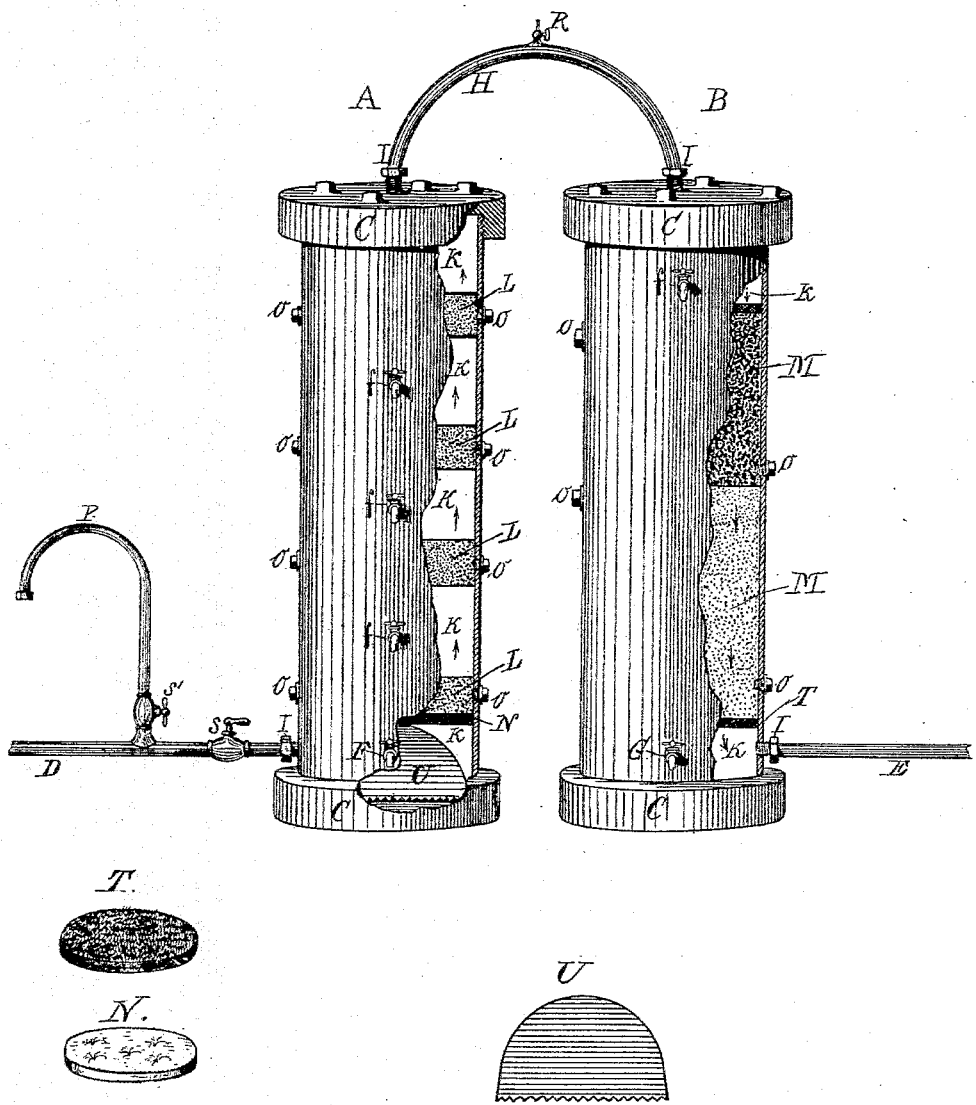
WITNESSES:
Lucius Bell INVENTOR

UNITED STATES PATENT OFFICE.

LUCIUS BELL, OF BROOKLYN, NEW YORK.

FILTER.

SPECIFICATION forming part of Letters Patent No. 356,819, dated February 1, 1887.

Application filed June 15, 1886. Serial No. 205,289. (No model.)

*To all whom it may concern:*

Be it known that I, LUCIUS BELL, a citizen of the United States, residing in the city of Brooklyn, in the county of Kings and State of New York, have invented a new and useful Improvement in the Domestic Filter; and I do hereby declare the following to be a full, clear, and exact description of the same.

My invention relates to a means of detaining foul matter and of discharging it from the filter to prevent its interfusion with the whole mass of filtering material, to a method of supplying and removing inclosed material with facility, and to supporting fine material above a water-chamber in a downward current. I use two vertical cylinders united at the top by a conducting-pipe, and described more particularly as follows, reference being made to the annexed drawing, which forms a part of this specification.

The figure represents the external form of the apparatus, and also its internal arrangements and appurtenances.

A and B are two wrought-iron cylinders. C C are cast-iron caps screwed upon the ends of the cylinders. D is the induction-pipe connected with the water-supply. E is an eduction-pipe for conveying pure water where it may be desired. F is a faucet for the principal discharge of impure water. G is a faucet where pure water may be drawn. *f f* are faucets for the examination and discharge of partially-cleansed water and for reversing the current. H is a conducting-pipe connecting the two cylinders. I I are nipples and couplings. K K are water-apartments. L L are filter-compartments. M is a filter mass. N is a tacked diaphragm. O O are plugged apertures. P is an india-rubber tube. R is an air-cock. S is a stop-cock in the inlet-pipe. S' is a stop-cock for the rubber-tube. T is a porous plate. U is a deflector.

In order to detain foul matter at its point of entrance, I construct a tacked diaphragm in the following manner: I take a hoop of wood, about one-fourth inch less in diameter than the cylinder and one-half inch in width, and attach two disks of wire-cloth to its two sides, like drum-heads, filling the space between them with granulated filter material. This material is liable to be displaced by currents of water. To prevent this, which it is important to do, I compress it and bind it by tacking as upholsterers tack through the disks and mass with fine wire. This diaphragm is cemented to the interior of the cylinder directly above the point where the water is admitted and above the faucet F. Its compact substance will obstruct most of the foul matter that impinges it, and gravitation will aid in the detention of the same.

To prevent sediment from accummulating upon the bottom of the cylinder, I make a deflector to cause its disturbance and removal, as follows: I use a piece of tin in shape of half an ellipse divided at its shortest axis. The straight edge of it is equal to the diameter of the cylinder, and has two or more points or continuous notches to support it, so as to leave a small passage under it while it rests upon the bottom of the cylinder. This plate inclines at an angle of about forty-five degrees, and the curved line rests upon the periphery and covers the outlet F. The inlet D is on the upper side of this plate, and the faucet F being at the under side, whenever water is drawn from F it must pass through the notches at the bottom of the cylinder and disturb and remove the sediment.

To more thoroughly abstract impurities, I provide in the cylinder A several filter-compartments, and between them alternately are water-chambers. Each chamber is provided with a lateral outlet through a hose bib-cock. If water is drawn frequently from the first or lowest chamber, but little impurity will ever go above it. If, however, any does pass it will be obstructed in the next chamber, and may be drawn away, and so on again and again. A reverse current may be had through either of these filter-compartments by closing the stop-cock S, opening the one, S', and attaching the hose at *f* above the compartment, and opening this *f* and the one below it. Attention to these details will render renovation by other means unnecessary for long periods, and will diminish the work of the succeeding parts of the instrument.

In order to insert and to expel the filter material without removing the top or any essential fixture, I provide inclosed filter-compartments with lateral inlets and outlets, as follows:

I have two disks of wire-cloth on two hoops of fitting circumference, and cement the hoops to the interior of the cylinder. On two opposite sides of the cylinder I have two perforations, entering between the hoops, to be ordinarily closed by screw-plugs. Lay the cylinder on its sides, close one of the apertures, and into the other pour granulated quartz through a funnel to fill the space, and then close it with a plug. The quartz can be renewed, whenever necessary, by removing the two plugs and inserting on one side a nipple coupled with the hose P, and turning the current of water through it. Although the upward current has some obvious advantages, it is liable to disturb a filter mass and so diminish its effect as a sieve, and some substances can be best removed from water by a downward current passing through and compressing fine filter material. I therefore combine the cylinder A with the one B, which last is nearly filled with the finest of granulated quartz and some bone-charcoal.

It is difficult to support such fine material with water descending through it without having some of it run out with the water. Plates and tubes of various materials with regular perforations are in use; but it is impracticable to effect definite foramina so minute and so abundant as to support this fine mass in immediate contact and to admit a free flow of water. To meet this difficulty, I produce a plate that is pervaded with fine pores of indefinite direction and extension, technically a porous plate. The porousness and cohesiveness in combination are obtained by a limitation of the proportions of the several general components. I use crushed coke sifted through ten and detained by fourteen meshes to an inch for the mass. Take Portland cement of the star brand, mix three parts of it with two parts of water, and then add nine parts of the mass, (all by measure,) and mix again.

For a mold have an iron hoop, one inch wide and about one-fourth of an inch less in diameter than the cylinder, placed upon a board. Fill the hoop with the mixture and make it even without unnecessary pressure. Thin paper will prevent adhesion to the board and hoop. Let the plate stand twenty-four hours, and then put it in water for several days to more perfectly indurate, and thereafter remove the hoop. To obtain greater strength, granulated quartz of the same size may be used in part or entirely, instead of the coke, for the mass. The porousness depends upon using substantially the proportions named above of the three general components—water, cement, and the mass—as described. This plate is for use under a pressure of about twenty-five pounds to the square inch. Within narrow limits, a variation may be made to suit various degrees of pressure. Finer mass or more cement or more water will diminish the pores. Coarser mass or an admixture of chopped sponge or other fiber will increase the porousness. Beyond quite narrow limitations, a variation will produce on the one hand an impervious concrete, or on the other an incoherent or fragile mass. This plate is to be cemented into the cylinder B directly above the outlets E and G, and is to support the fine filter mass. After it is in position to receive a current, water should be allowed to run through it until the same is tasteless before it is applied to use.

I do not claim a plate made porous by a perforating-mold or by punctures; nor by the admixture of soluble nor combustible material. I do not claim a concrete, nor, broadly, an artificial stone, nor an artificial porous stone, nor a plate with perforations of any definite direction or extension. I do not claim, merely, a diaphragm inclosing filter material; but, Having described my invention, what I do claim as new, and desire to secure by Letters Patent, is—

1. In a filter, the vertical cylinder A, having an alternate series of filter-compartments and water-chambers, all with lateral apertures externally, combined with the rubber pipe P and the valve S', and with the tacked diaphragm N and the deflector U, all substantially as and for the purposes herein specified.

2. A mode of producing porous bodies, which consists in uniting a paste made of two parts water and three parts Portland cement, with nine parts of crushed coke, such as is herein described, and substantially as specified.

3. The mode of producing a porous body by a combination of two parts water, three parts Portland cement, and nine parts of a mass of solid particles of such sizes as, when screened, will be detained between two sieves having respectively ten and fourteen meshes to an inch, and substantially as and for the purposes specified.

LUCIUS BELL.

Witnesses:
C. W. LANGFORD,
FRED S. WELLS.